United States Patent [19]

Rawson et al.

[11] 4,233,589
[45] Nov. 11, 1980

[54] ACTIVE T-COUPLER FOR FIBER OPTIC LOCAL NETWORKS WHICH PERMITS COLLISION DETECTION

[75] Inventors: Eric G. Rawson, Saratoga; Robert M. Metcalfe, Palo Alto, both of Calif.

[73] Assignee: Xerox Corporation, Stamford, Conn.

[21] Appl. No.: 43,391

[22] Filed: May 25, 1979

[51] Int. Cl.² .......................... H04Q 9/00; H04B 9/00
[52] U.S. Cl. ........................ 340/147 R; 340/147 LP; 455/612
[58] Field of Search ......... 340/166 R, 147 R, 147 LP, 340/ 147 P, ; 179/18 GF; 250/552, 199

[56] References Cited
U.S. PATENT DOCUMENTS 4,063,220  12/1977  Metcalfe ..................... 340/147 LP

*Primary Examiner*—Harold I. Pitts
*Attorney, Agent, or Firm*—Franklyn C. Weiss

[57] ABSTRACT

An active T-coupler for fiber optic local networks which permits collision detection wherein two input 36, 44 optical fibers are coupled to photodetectors 360, 440, respectively. Two output 34, 46 optical fibers are coupled to receive light from light sources 340, 460. Driving sources 340, 460 are gate circuits 342, 462, which function in a manner similar to an OR gate, via driver circuits 341, 461. These OR gates receive electrical signals from the host station or an input light fiber detector. Further, the input detectors 360, 440 provide electrical signals to the driving OR gates 342, 462 to pass the signal on, i.e. repeat, or drive OR gate 370 to transmit the signal to the host station. Thus the coupler can act as an optical repeater or transmit originally generated light signals in either the forward or reverse directions. Further, the host station can monitor the electrical signals from the input detectors to detect the occurrence of a data collision while transmitting and thereby react appropriately.

7 Claims, 3 Drawing Figures

ACTIVE T-COUPLER FOR FIBER OPTIC LOCAL NETWORKS WHICH PERMITS COLLISION DETECTION

The invention relates to an active T-coupler for fiber optic local networks which permits collision detection; the coupler implementing collision detection with an active repeater function, providing bi-directional data flow in data communication systems.

BACKGROUND OF THE INVENTION

As computers have become smaller and more numerous, the reasons for interconnecting them have grown more than in proportion. Remote computer networks like the Arpanet have been developed to promote resource sharing; for example the sharing of expensive specialized processors, software, and data bases. Multiprocessor computer configurations like the Illiac IV have been developed to get the increased performance of multiple computers working simultaneously on the same problem for either improved throughput or reliability. Local computer networks like that disclosed in U.S. Pat. No. 4,063,220, issued Dec. 13, 1977, entitled "Multi-Point Data Communication System With Collision Detection", have been developed for reasons resembling those of both remote computer networks and multiprocessors. The experimental communication system set forth in the patent, in particular, connects up to 256 communicating computers at 3 million bits per second through up to 1 kilometer of coaxial cable.

The aforementioned patent discloses apparatus for enabling communications between two or more data processing stations comprising a communication cable arranged in branched segments including taps distributed thereover. Tied to each tap is a transceiver which, on the other side, connects to an associated interface stage. Each transceiver includes, in addition to the usual transmitter and receiver sections, a gate which compares the data from the interface stage with the data on the cable and indicates whether such are equal. Should such be unequal, an interference between the transceiver and the cable is indicated, disabling the associated transmitter section. Each interface stage tied to such transceiver also includes an input and an output buffer on the other end thereof interfacing with a using device, such input and output buffers storing both the incoming and outgoing data. The output buffer is connected to a clock driven shift register which converts the buffered data to a serial stream, feeds such data to a phase encoder, which then connects to the transmitter or driver section of the transceiver. The input buffer is loaded by an input shift register which derives its clock from a phase decoder, the shift register and the phase decoder both connecting to the receiver section.

When the station is to start transmitting, the phase decoder detects the presence of other transmissions on the cable and detains the output shift register until no other transmissions are sensed. Once a transmission has begun, if interference is detected and the transmitter section is disabled, a random number generator is used to select an interval of time at the completion of which the next attempted transmission will take place. Concurrently, a counter counts the number of interferences, or collisions, which recur in the attempted transmissions of one data packet and weights the mean of the random number generator accordingly.

The input shift register is also connected to an address decoder which enables data transfer to the input buffer only during those times when the data is preceded by an appropriate address. Thus, the patent discloses a bit-serial receiver-transmitter network continuously connected to all communicating devices. More specifically, such is accomplished by forming a network of any one or plurality of transmitting media, such as coaxial cable, optical fiber or others, connected together into one branched network by constantly active devices, like repeaters, by which communications necessarily adapted to one medium are translated into the other medium.

According to the present invention, instead of electrically conducting coaxial cable, a fiber optic local computer network is disclosed. The present invention was first disclosed in an article entitled "Fibernet: Multimode Optical Fibers for Local Computer Networks" in the IEEE Transactions On Communications, Vol. COM-26, No. 7, July 1978, pp. 983 to 990.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
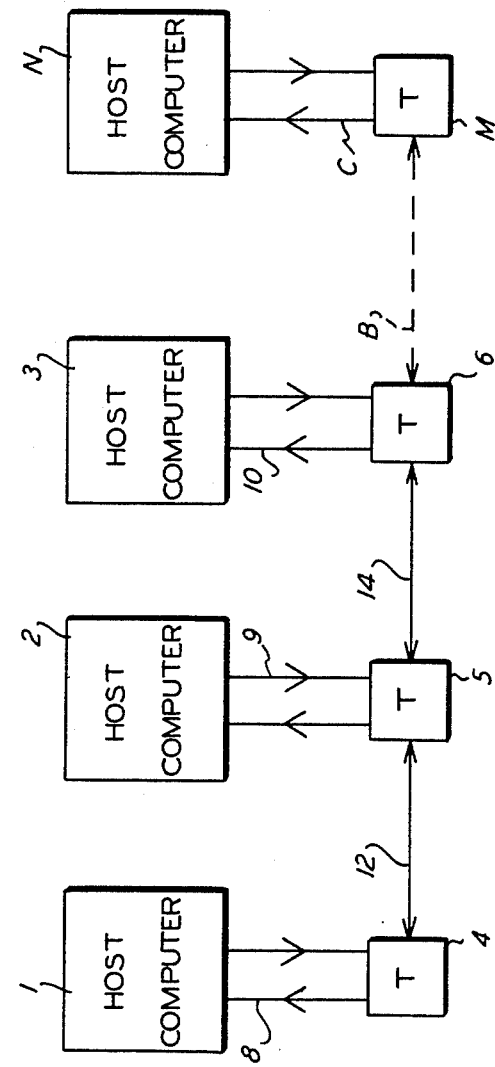
FIG. 1 is a block diagram of a linear, single-fiber bi-directional passively teed network, in accordance with the invention.

As set forth above, local computer networks which communicate over copper conductors have been developed both to promote resource sharing and to provide increased performance. Such networks typically operate at bandwidth times length products up to a few megacycle-kilometers. Straight forward substitution of fiber optic components for communication system electronics, such as set forth in U.S. Pat. No. 4,063,220, hereinafter set forth as the patented system, would result in an optical system, a bi-directional passively teed network such as set forth in FIG. 1. Such a configuration can, in principle, support much higher data rates over great distances; that is, operate at a much higher bandwidth-length product (BwL). In FIG. 1, host computer 1 would be connected to bi-directional tee coupler 4 by fiber or electrical conductors 8. Coupler 4 would be connected to coupler 5 by a fiber optic data bus 12. Similarly, host computers 2, 3 ... N would be coupled by conductors 9, 10 ... C to couplers 5, 6 ... M. Busses 12, 14 ... B would connect the couplers to each other to form the requisite network.

Two problems exist with a straight substitution of fiber optics for copper conductors however. First, the insertion loss of tee connections and associated connectors and splices must be very low, nor more than a few tenths of a db per station, for useful numbers of terminals to be possible. When experiments relating to the present invention were undertaken, insertion splice and connector losses were sufficiently high to make the permissible number of stations unattractively low. However, recent public disclosures have described a tapered, fused fiber tap with improved insertion losses, so this impediment to linear teed networks is no longer so severe. The second problem in making a linear, bi-directional teed network is that reflections at connectors, splices and tees should be sufficiently low to permit each station to monitor, while transmitting, for other interfering signals on the data bus without such an interfering signal being masked by the stations's own reflected signal. Also disclosed in the prior art was point-to-point bi-directional communications over a single optical fiber, using the tees described earlier and avoiding the use of connector or other components in the line at which reflections could occur. In spite of this achievement, however, it was not clear that bi-directionality, in a single fiber multi-terminal network was practical.

Figure 2A:
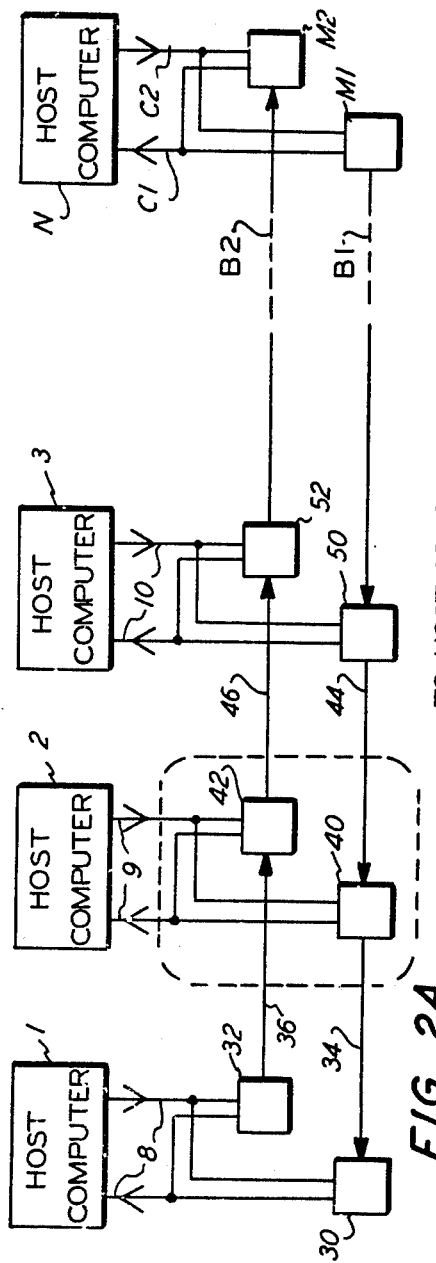
FIG. 2A is a block diagram of a linear, double-fiber unidirectional repeatered tee network; with FIG. 2B being an expanded circuit diagram of the repeater connections to the data buses seen in FIG. 2A.
Figure 2B:
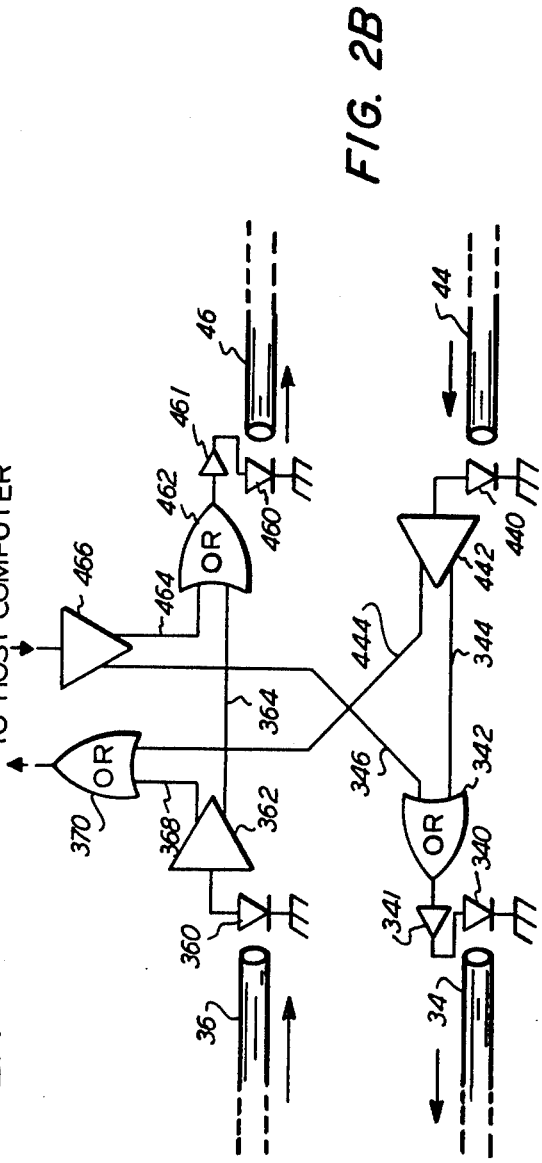

One configuration which minimally distorts the highly desirable patented system topology is the unidirectional actively teed network, as seen in FIGS. 2A and 2B. Two fibers 34, 36 or 44, 46 or B1, B2 are carried from station to station, i.e., from host computer 1 to host computer 2 to host computer 3 to host computer N. Each of the fibers carries light in only one direction, as indicated by the arrow directions on the data busses. Each transceiver 30, 32 or 40, 42 or 50, 52 or M1, M2, has four fiber terminations, two receivers and two transmitters. Coupling the repeaters to host computers 1, 2, 3 ... N would be electrical conductors 8, 9, 10 ... C1, C2. While repeated transmissions are still in electrical form inside each transceiver, signals are received for the host computer station by merging from each optical detector and are transmitted by driving each optical source, as shown in FIG. 2B.

Referring to FIG. 2B, for ease of illustration, the input and output fiber data busses are given the same reference designations as set forth in FIG. 2A. Thus, bus 36 is coupled to light detector 360. Detector 360 is connected as an input to amplifier 362. One output, 364, from amplifier 362 is an input to OR gate circuit 462, while the other output is an input to OR gate 370. Gate 370 would be connected directly to the host computer. Coming from the host computer would be a conductor connected to amplifier 466; one output of which is connected to the other input of OR gate 462, the other output thereof being connected to one input of OR gate circuit 342, said gate circuits functioning in a manner similar to an OR gate. The output from OR gate 462 is coupled via drive circuit 461 to light emitting diode 460 which acts as the modulated light source to data bus 46. Data bus 44 is coupled to light detector 440, which is connected to amplifier 442. The outputs of amplifier 442 is connected by line 44 to OR gate 370 and by line 344 to OR gate 342. Light emitting diode 340, via drive circuit 341, acts as the light source to data bus 34.

This coupler provides bi-directional data flow, one flow entering from bus 36 and leaving on bus 46. The other flow enters from data bus 44 and leaves on bus 34. Receiver 362 and driver 461 are required for one direction while receiver 442 and driver 341 are required for the other direction, with the drivers driving when either the receiver comes on or when the host computer demands. The host computer is given data if it arrives from either direction by ORing receivers 362 and 442 by OR gate 370. The host computer transmits data by transferring it to drivers 342 and 462 via amplifier 466.

The host computer looks for collisions by monitoring for data received by receivers 442 and 362. If any data transactions are detected on either of the receivers 362, 442 during a packet transmission, then a collision is assumed and transmission from the host computer is aborted. Such collision detection is more reliable than that disclosed in the patented system, above, because the transceivers need not monitor signal differences, but merely the presence or absence of any data on the line.

The advantage of this two fiber active optical system is that signaling is performed under the most favorable conditions, using point-to-point, unidirectional data links between repeaters. The relatively low bandwidth-length product for such links permits the use of inexpensive and reliable sources, fibers, connectors, and detectors. The routing of two fibers rather than only one offers no practical disadvantage in local computer networks owing to the high cost of installation relative to the low cost of fiber; fibers are sufficiently small that a two fiber cable is still small compared to the equivalent coaxial cable. Finally, the reliability of powered and actively repeating components is lower than that of passive components such as used in the patented communication system.

From the standpoint of communication protocol, rather than of transmission technology or topology, an optical fiber data bus system is equivalent to the patented system set forth above. The principles of distributed packet switching embodied in the patented system have proven sound for local computer networking.

The packet switching technique set forth in the patent is distributed in two senses: first in the way that packets are put onto the communication line, and second, in the way packets are removed from the communication line by intended destinations. Packets are switched from the line using simple broadcast address recognition distributed among the stations. Packet interweaving is a bit more unusual. In short, a packet is transmitted by a station only after the station determines that no previous transmission is still in progress. During transmission of its own packet, a station monitors the communication line looking for a colliding packet transmission from another station. It interference is not detected, packet transmission runs to completion; otherwise, transmission is immediately aborted and rescheduled for some randomly chosen later time. When this procedure is followed at each station contending for transmission time on the communication line, the result is statistical multiplexing of the communication medium; in the patented system, a coaxial cable, and in the present system the optical fibers.

There are several well known attributes of fiber optics which may lead one to choose to use fiberoptics rather than coaxial cable for a local computer network. As set forth above, these include a higher bandwidth-length product, potentiallay lower cable costs, reduced installation costs because of the lack of need to conform to local electrical wiring ordinances (no conduit, for example), enhanced security, and the freedom from electronic interference problems. These must be balanced against the additional component complexity that fiber optics introduces. The final choice is determined by the technical requirements and economics of each application. It seems clear, however, that a passive local computer network requiring bandwith-length products significantly in excess of a few megacycles-kilometers will require a fiber optic network of some form, typically as set forth in the present application.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. An active T-coupler for fiber optic communication networks wherein the improvement is characterized by:
   input detection means (360, 440) for each of a plurality of input fiber optic data busses (36, 44) each for generating electrical signals upon receipt of light signals on the related one of said input fiber optic data business,
   means (362, 442, 370) coupled to said input detection means for transmitting said received signals to a utilization device and further output circuitry,
   means (466, 462, 342) coupled to said utilization device for receiving signals generated by said utilization device, and
   output generation means (340, 341, 460, 461) for each of a plurality of output fiber optic data busses (34, 46) coupled to said input detection means for any and all related input data bus or busses and said means for receiving signals generated by said utilization device, each for generating light signals in response to said signals generated by said utilization device or to be repeated as light signals in response to the electrical signals from said input detection means as related to said input fiber optic data busses.

2. An active T-coupler for fiber optic collision detection networks comprising a plurality of input and output fiber optic data bus pairs, wherein the improvement is characterized by:
   input detection means (360, 440) for each of said plurality of input fiber optic data busses, each for generating electrical signals upon receipt of optical light information on said input fiber optic data bus,
   first circuit means (362, 442, 370) coupled to said input detection means for transmitting said received signals to a utilization device and further output circuitry,
   second circuit means (466, 462, 342) for receiving signals generated at said utilization device, and
   output generation means (340, 460) for each of said plurality of output fiber optic data busses, and coupled to said input detection means for the related input data bus of said pair and said second circuit means, for generating light signals in response to said signals generated by said utilization device or to be repeated as light signals in response to the electrical signals from said input detection means for the related input fiber optic data bus of said pair.

3. The coupler as set forth in claims 1 or 2, wherein the signals received by the means coupled to said utilization device for receiving signals generated thereby are interrupted upon detection by said utilization device of signals detected by said input detection means.

4. The coupler as set forth in claim 1 wherein each input detection means comprises,
   photodetection means (360, 440) for generating electrical signals in response to applied optical signals, and
   amplification means (362, 442) for amplifying and/or reshaping said electrical signals to levels and forms usable by subsequent circuitry.

5. The coupler as set forth in claim 4 wherein each output generation means comprises,
   amplifier logic means (341, 342, 461, 462) for generating electrical signals of suitable output levels, and
   light emitting circuit means (340, 460) for generating optical light signals in response to said electrical signals.

6. The coupler as set forth in claim 5 wherein said plurality of input fiber optic data busses comprises two thereof and said plurality of output fiber optic data busses comprises two thereof, whereby one each (36, 44) of said input fiber optic data busses operate in operative pair relationship with one each (46, 34) of said output fiber optic data busses.

7. The coupler as set forth in claim 3 wherein the utilization device is an electronic computer (2).

* * * * *

UNITED STATES PATENT AND TRADEMARK OFFICE
CERTIFICATE OF CORRECTION

PATENT NO. : 4,233,589
DATED : November 11, 1980
INVENTOR(S) : Eric G. Rawson et al It is certified that error appears in the above-identified patent and that said Letters Patent are hereby corrected as shown below:

Column 5, line 12, delete "business" and insert --busses--.

Signed and Sealed this

Third Day of March 1981

[SEAL]

Attest:

RENE D. TEGTMEYER

Attesting Officer

Acting Commissioner of Patents and Trademarks